US009368951B2

(12) United States Patent
Komiya (10) Patent No.: US 9,368,951 B2
(45) Date of Patent: Jun. 14, 2016

(54) ARTICULATED CABLE PROTECTION AND GUIDE DEVICE

(75) Inventor: Shoichiro Komiya, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 13/353,715

(22) Filed: Jan. 19, 2012

(65) Prior Publication Data

US 2012/0187271 A1 Jul. 26, 2012

(30) Foreign Application Priority Data

Jan. 21, 2011 (JP) ................................ 2011-010857

(51) Int. Cl.
*H02G 11/00* (2006.01)
*F16L 3/015* (2006.01)
*H02G 3/04* (2006.01)

(52) U.S. Cl.
CPC .............. *H02G 11/006* (2013.01); *F16L 3/015* (2013.01); *H02G 3/0487* (2013.01)

(58) Field of Classification Search
CPC ....... H02G 11/00; H02G 3/04; H02G 3/0462; H02G 3/0475; H02G 3/0487; G02G 11/006; F16L 3/01; F16L 3/015; F16L 3/22; F16G 13/16
USPC ........ 248/60, 62, 74.1, 74.2, 74.3, 49, 65, 51, 248/68.1; 24/265 B, 265 R, 265 WS; 59/78.1; 174/68.1, 69, 70 R, 74 R, 77 R, 80, 60; 165/162, 172, 178; 138/115, 117
See application file for complete search history.

(56) References Cited

U.S. PATENT DOCUMENTS

| 3,097,036 | A | * | 7/1963 | Cornell, Jr. | ........ | H01R 13/502 |
| | | | | | | 156/55 |
| 3,473,604 | A | * | 10/1969 | Tiefenbacher | ............ | F28D 9/00 |
| | | | | | | 165/166 |
| 3,637,008 | A | * | 1/1972 | Michel et al. | .................... | 165/69 |
| 4,171,860 | A | * | 10/1979 | Katz | ........................ | H01B 7/08 |
| | | | | | | 174/117 F |
| 4,204,570 | A | * | 5/1980 | Eisinger | ............... | F28F 9/0132 |
| | | | | | | 122/510 |
| 4,344,480 | A | * | 8/1982 | Boyer et al. | ................... | 165/162 |
| 4,349,404 | A | * | 9/1982 | Changani et al. | .......... | 156/308.4 |
| 4,384,697 | A | * | 5/1983 | Ruhe | ..................... | F28F 9/0135 |
| | | | | | | 165/162 |
| 4,433,721 | A | * | 2/1984 | Biaggi | .................. | F28F 9/0135 |
| | | | | | | 165/162 |
| 4,577,684 | A | * | 3/1986 | Hagemeister | ................. | 165/172 |
| 4,611,656 | A | * | 9/1986 | Kendall, Jr. | ......... | E21B 17/1035 |
| | | | | | | 138/107 |
| 4,640,032 | A | * | 2/1987 | Lewis | ............................. | 40/316 |
| 4,847,443 | A | * | 7/1989 | Basconi | .................. | H01B 7/40 |
| | | | | | | 174/115 |

(Continued)

FOREIGN PATENT DOCUMENTS

JP        4157096        7/2008
WO     2004049509 A3    6/2004

*Primary Examiner* — Jonathan Liu
*Assistant Examiner* — Guang H Guan
(74) *Attorney, Agent, or Firm* — Woodling, Krost and Rust (57) ABSTRACT

There is provided an articulated cable protection and guide apparatus that can securely and stably guide a large number of cables and can assure durability of articulated supporting members operating between straight and bending postures for a long period of time. The articulated cable protection and guide apparatus comprises articulated supporting members which can be easily cut and connected. Each of the articulated supporting members includes a large number of synthetic resin block bodies linked with each other. A plurality of flexible belt members includes tubular storing portions formed in parallel in a belt width direction.

10 Claims, 10 Drawing Sheets

(56) References Cited

U.S. PATENT DOCUMENTS

| | | | |
|---|---|---|---|
| 5,033,542 A * | 7/1991 | Jabs | 165/162 |
| 5,535,787 A * | 7/1996 | Howell | 138/167 |
| 6,241,200 B1 * | 6/2001 | Camporeale et al. | 248/68.1 |
| 6,858,797 B2 * | 2/2005 | Sheikholeslami et al. | 174/480 |
| 6,984,782 B2 * | 1/2006 | Ikeda et al. | 174/21 JS |
| 7,617,669 B1 * | 11/2009 | Komiya et al. | 59/78.1 |
| 7,784,259 B2 * | 8/2010 | O'Rourke et al. | 59/78.1 |
| 8,155,755 B2 * | 4/2012 | Flynn et al. | 607/116 |
| 8,662,456 B2 | 3/2014 | Komiya | |
| 9,083,159 B2 * | 7/2015 | Takeuchi | H02G 3/0475 |
| 2011/0240805 A1 | 10/2011 | Komiya | |
| 2012/0125585 A1 * | 5/2012 | Morrison et al. | 165/172 |
| 2012/0187271 A1 * | 7/2012 | Komiya | F16L 3/015 248/634 |
| 2013/0092434 A1 * | 4/2013 | Kato | B60R 16/0215 174/72 A |
| 2014/0014406 A1 * | 1/2014 | Gundel | H01B 7/0861 174/350 |

* cited by examiner

ARTICULATED CABLE PROTECTION AND GUIDE DEVICE

CROSS REFERENCE TO RELATED APPLICATIONS

This application claims the foreign priority benefit under Title 35, United States Code, §119 (a)-(d) of Japanese Patent Application No. 2011-010857, filed on Jan. 23, 2011 in the Japan Patent Office, the disclosure of which is herein incorporated by reference in its entirety.

BACKGROUND OF THE INVENTION

1. Field of the Invention

The present invention relates to an articulated cable protection and guide apparatus for protecting and guiding flexible cables and hoses such as electric cables, optical fiber cables and fluid supplying hoses used for machine tools, electronic devices, industrial robots, transportation machines to feed power, fluid, air and mediums to those moving machines or to a moving part of the machines.

2. Related Art

If the cables are connected to a mobile body of a machine tool, a civil engineering machine or conveying apparatus without protection in an exposed state, the cables may be damaged by intolerable torsion or tension when they are moved. To support and guide the cables, a cable protection and guide apparatus is used.

In Japanese Patent No. 4157096 (Claims, Paragraphs [0031] through [0034], FIG. 21), the prior art cable protection and guide apparatus includes: conductors, conduits for conveying gas and other fluids, and, supporting members composed of continuous material strips each having a series of non-interlocked action-limited solid bodies sealed within a plurality of channels and disposed in parallel.

Problems to be Solved by the Invention

Because the prior art cable and guide apparatus includes a flexible material composing the supporting member made from stainless steel or a leaf spring, it is difficult to install it within a predetermined space because it is unable to maintain an accurate bending radius when it is in the bending posture and its bending radius becomes large and may contact an obstacle. When stainless steel is used as the flexible member in particular, the prior art cable protection and guide apparatus may breakdown from fatigue and rupture thus becoming unusable.

Because the prior art cable protection and guide apparatus include a flexible material composed of a supporting member made of stainless steel or a leaf spring which cannot be easily cut and connected, the supporting member cannot be replaced. The prior art cable protection and guide apparatus may resonate and become de-stable because the twisting rigidity of the supporting member is low in its bending state.

The prior art cable protection and guide apparatus requires considerable time and effort for its production and cannot be mass-produced because pieces formed of resin must be injection-molded on the stainless steel and leaf spring.

The prior art cable protection and guide apparatus accommodates numerous conductors, conduits for conveying gas, and supporting members composed of continuous material strips each having a series of non-interlocked action-limited solid bodies sealed within the plurality of channels and disposed in parallel. When the prior art includes numerous conduits to be sealed, it becomes necessary to replace the prior art cable protection and guide apparatus with a wider apparatus having a plurality of channels corresponding to the number of conduits. The prior art cable and protection guide, being wider, is difficult to fit in a given installation space. Further, when numerous conduits take straight and bending postures, widthwise strain is caused which induces damage to the conduits and the supporting members.

SUMMARY OF THE INVENTION

Accordingly, the present invention aims at solving the aforementioned prior art problems by providing an articulated cable protection and guide apparatus that can securely and stably guide a large number of cables, can assure durability of the articulated supporting members operating between a straight posture and a bending posture for long periods of time and can be easily cut and connected corresponding to its usage.

Means for Solving the Problems

In order to solve the aforementioned problems, according to a first aspect of the invention, there is provided an articulated cable protection and guiding apparatus, comprising:

articulated supporting members, each of the articulating supporting members includes a plurality of synthetic resin block bodies linked with each other, the block bodies are arranged in straight and bending postures;

a plurality of flexible belt members, each of the plurality of flexible belt members includes a plurality of tubular storing portions;

each of the flexible belt members includes a width, a length, a left side and a right side;

the articulated supporting members and/or cables are arranged in parallel in the flexible belt member width direction and are inserted and stored in the flexible belt members;

wherein the plurality of flexible belt members is disposed in the flexible belt longitudinal direction, the flexible belt members are overlapped vertically; and the articulated supporting members are inserted and stored in the tubular storing portions arranged on the right side and the left side of at least one of the flexible belt members.

According to a second aspect of the articulated cable protection and guide apparatus of the invention, each of the flexible belt members has vertically symmetric wavy sections formed of a plurality of tubular storing portions equally parted in the belt width direction.

According to a third aspect of the articulated cable protection and guide apparatus of the invention, the flexible belt members form a flexional circumferential bend having a flexional inner circumferential side and flexional outer circumferential side;

each of the flexible belt members includes a flexional inner circumferential side residing during bending on the flexional inner circumferential side of the bend;

each of the flexible belt members includes an outer circumferential side residing during bending on the outer flexional circumferential side of the bend;

the articulated supporting members are inserted through the flexible belt members disposed on the inner flexional circumferential side rather than the outer flexional circumferential side during bending posture among the plurality of flexible belt members.

According to a fourth aspect of the articulated cable protection and guide apparatus of the invention, the flexible belt members form a flexional circumferential bend having a flexional inner circumferential side and flexional outer circumferential side;

each of the flexible belt members includes a flexional inner circumferential side residing during bending on the flexional inner circumferential side of the bend;

each of the flexible belt members includes an outer circumferential side residing during bending on the outer flexional circumferential side of the bend; and, wherein the articulated supporting members are inserted through the flexible belt member disposed on the outer circumferential side during the bending posture.

According to a fifth aspect of the articulated cable protection and guide apparatus of the invention, each of the flexible belt members is molded of synthetic resin materials.

According to a sixth aspect of the articulated cable protection and guide apparatus of the invention, each synthetic resin block body includes a front side surface region and a rear side surface region, the front side region of the synthetic resin block body includes a link pin, and the rear side surface region includes a link pin hole; and, the link pin of one of the resin block bodies is concavo-convexly interfitted with the link pin hole of the next adjacent resin block body.

According to a seventh aspect of the articulated cable protection and guide apparatus of the invention, the rear side surface region of each of the resin block bodies includes a tapered concave cutaway fitting portion in communication with the link pin hole; and, the link pin of the front side surface region of each of the resin block bodies, during connection with the next adjacent resin block body, slidingly engages the concave cutaway fitting portion until the link pin enters the link pin hole.

According to an eighth aspect of the articulated cable protection and guide apparatus of the invention, each of the synthetic resin block bodies is provided with a straight posture keeping plane for keeping the synthetic resin block bodies in a straight condition and a bending posture keeping plane for keeping the synthetic resin block bodies in a bending condition.

It is noted here that the basic concept of the term "flexible belt member" of the invention means a belt-like long item that can take the straight condition and the bending condition when desired.

Advantageous Effects of the Invention

According to the first aspect of the articulated cable protection and guide apparatus of the invention, the invention includes articulating supporting members. Each of the articulating supporting members includes a plurality of synthetic resin block bodies linked with each other and the block bodies are arranged in straight and bending postures. The invention also includes a plurality of flexible belt members. Each of the plurality of flexible belt members includes a plurality of tubular storing portions. Each of the flexible belt members includes a width, a length, a left side and a right side. The articulated supporting members and/or cables are arranged in parallel in the flexible belt member width direction and are inserted and stored in the flexible belt members. The plurality of flexible belt members is disposed in the flexible belt longitudinal direction. The flexible belt members are overlapped vertically, and the articulated supporting members are inserted and stored in the tubular storing portions arranged on the right side and the left side of at least one of the flexible belt members. Utilizing this structure, it is possible to bring about the following peculiar effects.

That is, according to the first aspect of the articulated cable protection and guide apparatus of the invention, because the articulated supporting member is composed of the large number of synthetic resin block bodies linked with each other, the articulated supporting member can be obtained by linking the synthetic resin block bodies with each other. This can be accomplished without injection-molding pieces one at a time to stainless steel or a leaf spring as disclosed in the prior art described above.

Accordingly, it becomes possible to cut and connect the articulated supporting member easily corresponding to its desired usage as compared to a prior art flexible material, composing a supporting member formed of stainless steel that is hard to cut and connect.

The number of parts is reduced as compared to the prior art in which various long and short supporting members have to be stocked corresponding usage.

Because the plurality of flexible belt members is disposed in the belt longitudinal direction so as to overlap vertically in multi-stage (multiple layers or stages), it becomes possible to array and store the large number of cables in the belt width direction and also in the vertical direction. Accordingly, even if the cables to be protected and guided increase in number for a given application, it is possible to operate between the straight and bending postures by reliably storing the cables without changing the installation space in the belt width direction.

Because the articulated supporting members are inserted and stored in the tubular storing portions arrayed on both right and left sides of at least one flexible belt member among the plurality of flexible belt members, the articulated supporting members hold the flexible belt member in a laterally well-balanced manner without causing twist or deflection on both right and left ends in the belt width direction of the flexible belt member. Accordingly, it becomes possible to stably guide the cables respectively inserted into the plurality of tubular storing portions.

According to the second aspect of the articulated cable protection and guide apparatus of the invention, because the flexible belt member has the vertically symmetric wavy sections formed of the plurality of tubular storing portions equally parted in the belt width direction, the flexible belt members vertically disposed concavo-convexly engage and overlap with each other in a nesting condition through the vertically symmetric wavy sections. Accordingly, it becomes possible to prevent side slip that is prone to occur between the flexible belt members vertically disposed in the multi-stage and to steadily take the straight and bending postures even when an unexpected load is applied from the belt width direction during the cable protecting and guiding operations.

According to the third aspect of the articulated cable protection and guide apparatus of the invention, because the articulated supporting members are inserted through the flexible belt member disposed on the inner circumferential side rather than the outermost circumferential side during the bending posture among the plurality of flexible belt members, the flexible belt member disposed on the outermost circumferential side absorbs a bending impact applied from the peripheral contact member and blocks its influence to the articulated supporting members inserted through the flexible belt member on the inner circumferential side during the repetitive operations of the straight and bending postures. Accordingly, it becomes possible to assure durability of the articulated supporting members for a long period of time.

According to the fourth aspect of the articulated cable protection and guide apparatus of the invention, because the articulated supporting members are inserted through the flexible belt member disposed on the outermost circumferential side during the bending posture of the plurality of flexible belt members, the articulated supporting members engage with and are supported by the peripheral contact member indirectly through the intermediary of the flexible belt member disposed on the outermost circumferential side during the repetitive operations of the straight and bending postures. Accordingly, it becomes possible to stably bend and shift the cables, C.

According to the sixth aspect of the articulated cable protection and guide apparatus of the invention, because the flexible belt member is molded of synthetic resin materials, it becomes possible to easily work and mold the shape of the synthetic resin block bodies composing the flexible belt member.

Accordingly, it becomes possible not only to produce the light-weight flexible belt member corresponding to the shapes of the cables, but also to reduce sliding abrasion that is prone to be caused between the flexible belt member and the cables because the synthetic resin material, i.e., the flexible belt member, exhibits its self-lubricant effect.

According to the sixth aspect of the articulated cable protection and guide apparatus of the invention, because the link pin provided at the front side surface region of each synthetic resin block body composing the articulated supporting member fits with the link pin hole provided at the rear side surface region of the preceding synthetic resin block body, the link pin of the succeeding synthetic resin block body is axially and rotatably supported by the link pin hole of the preceding synthetic resin block body.

Accordingly, the synthetic resin block bodies of the articulated supporting member shift from the straight posture to the bending posture or from the bending posture to the straight posture smoothly and can guide the cables smoothly.

According to the seventh aspect of the articulated cable protection and guide apparatus of the invention, because the tapered cutaway fitting portion for concavo-convexly and vertically fitting the link pin of the front side surface region to the link pin hole of the rear side surface region is concavely provided continuously to the link pin hole of the rear side surface region, the link pin of the succeeding synthetic resin block body can be attached to the link pin hole of the preceding synthetic resin block body via the tapered cutaway fitting portion thereof without requiring excessive fitting force in cutting and connecting the synthetic resin block bodies of the articulated supporting member.

According to the eighth aspect of the articulated cable protection and guiding apparatus of the invention, because the synthetic resin block body is provided with the straight posture keeping plane for keeping the synthetic resin block bodies in the straight condition and the bending posture keeping plane for keeping the synthetic resin block bodies in the bending condition, the straight posture keeping plane and the bending posture keeping plane position retain the articulated supporting member in the straight and bending postures required Accordingly, it becomes possible to securely protect and guide the cables that take the bending posture and the straight posture even in a small and crowded installation space.

BEST MODES FOR CARRYING OUT THE INVENTION

First Embodiment

A first embodiment of an articulated cable protection and guide apparatus of the invention will be explained with reference to FIGS. 1 through 8.

Figure 1:
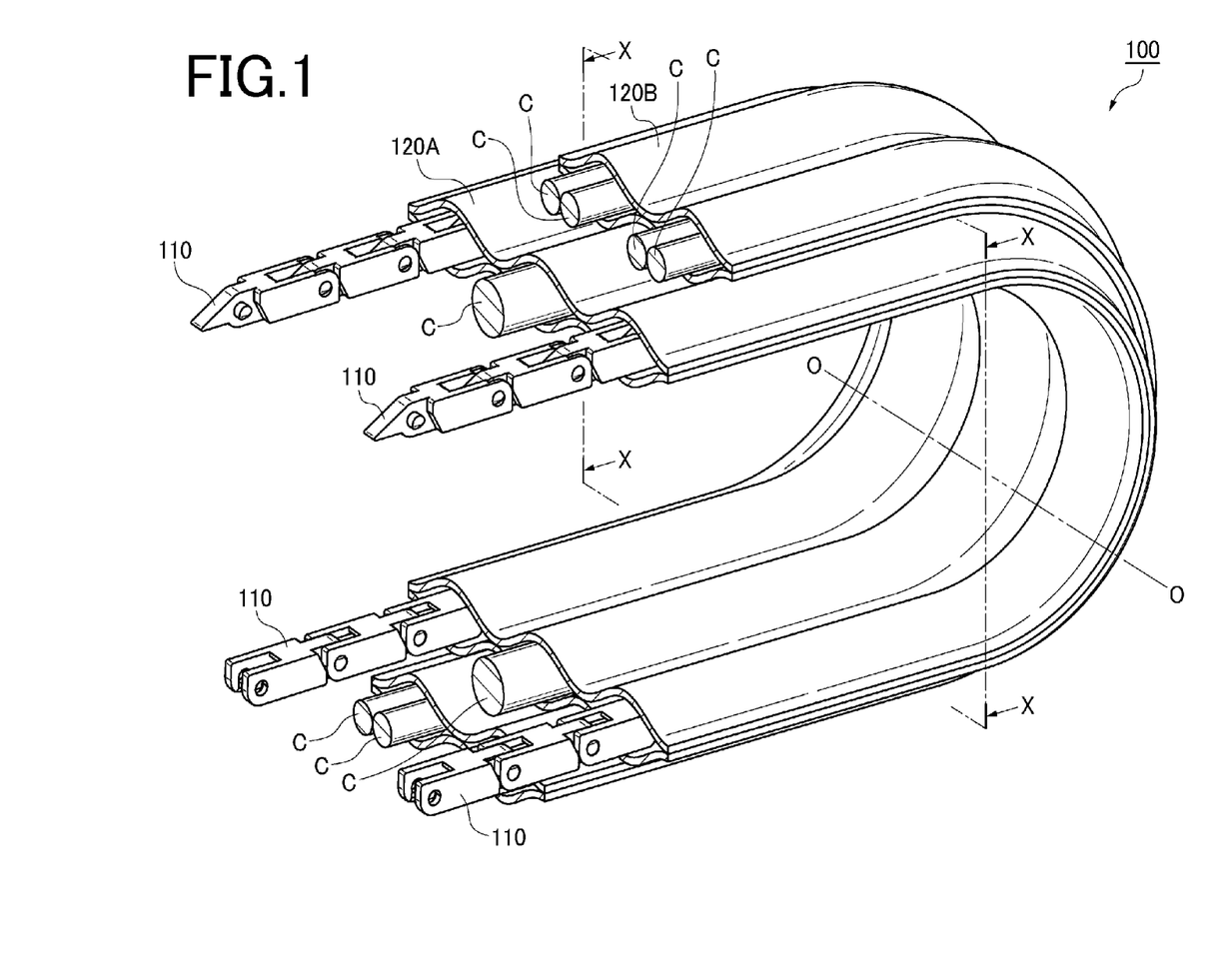
FIG. 1 is a schematic drawing of an articulated cable protection and guide apparatus of a first embodiment of the invention.
Figure 2:
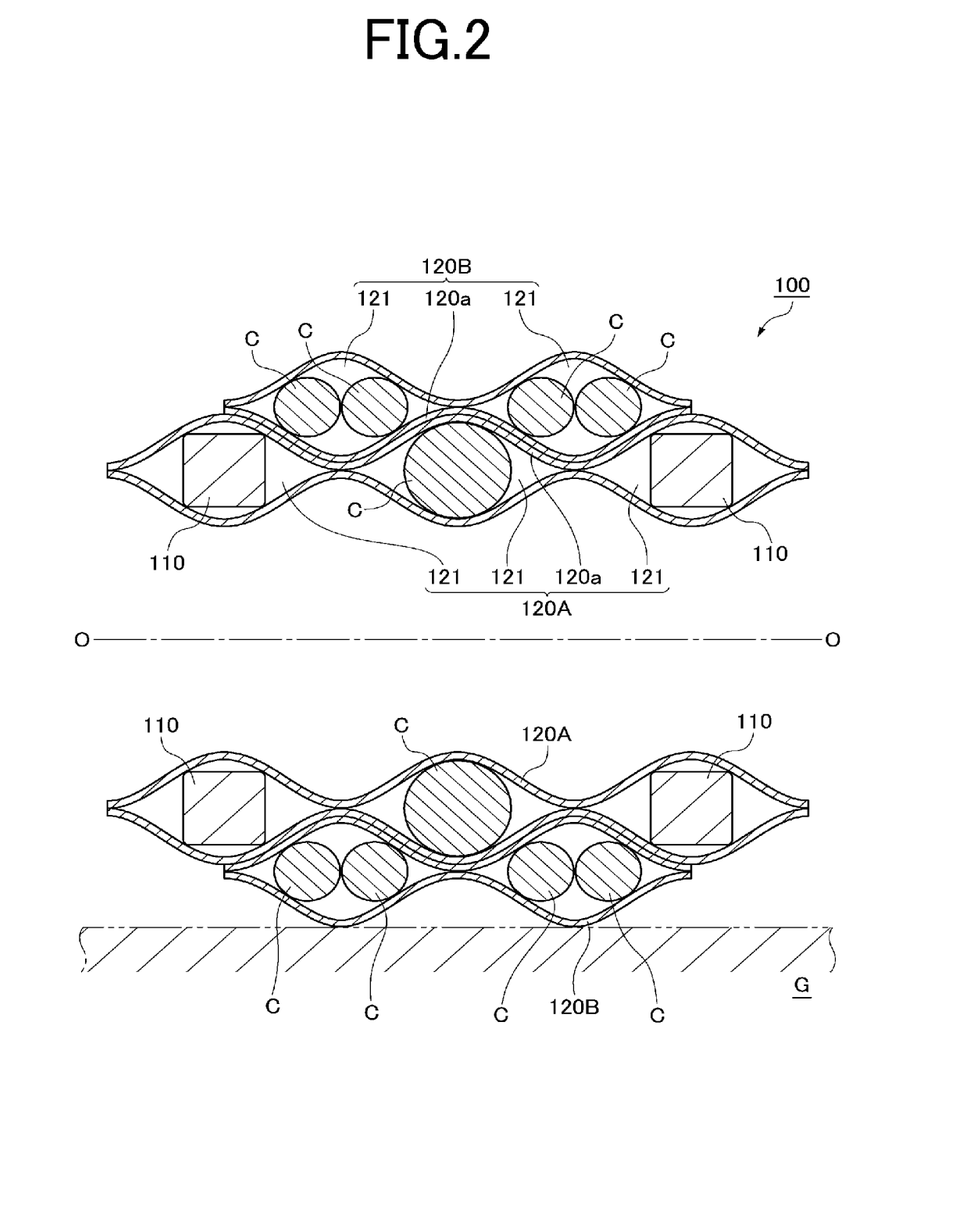
FIG. 2 is a section view taken along a line X-X in FIG. 1.
Figure 3:
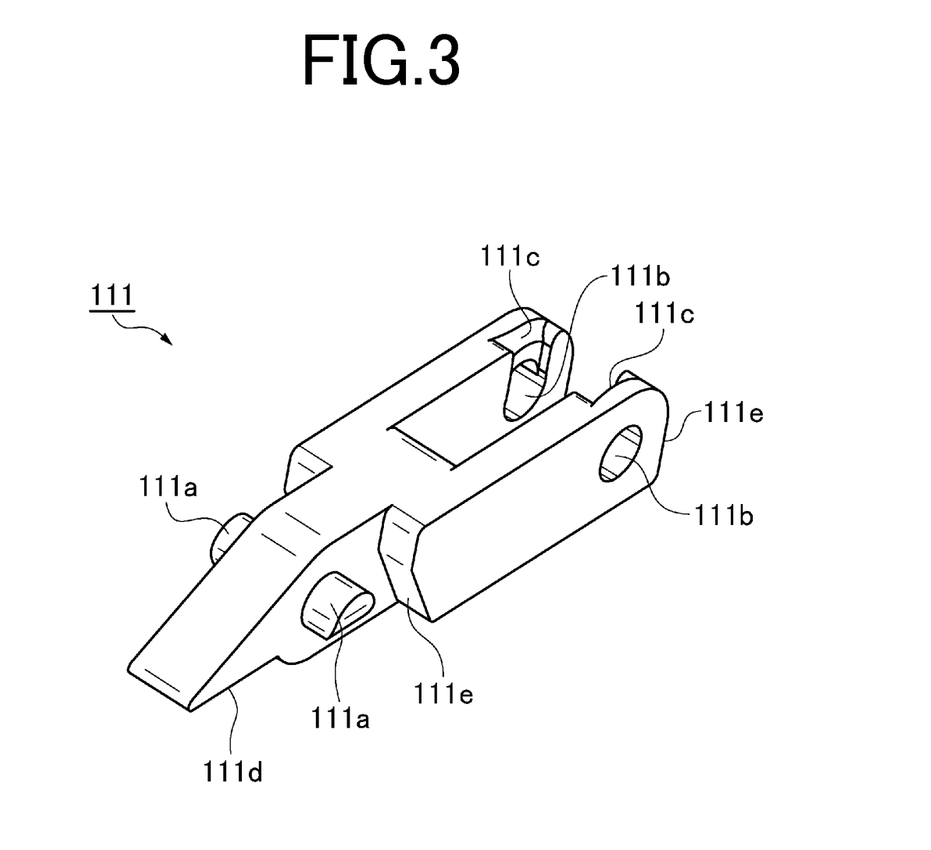
FIG. 3 is a perspective view of a synthetic resin block body shown in FIG. 1 seen from an obliquely front upper side.
Figure 4:
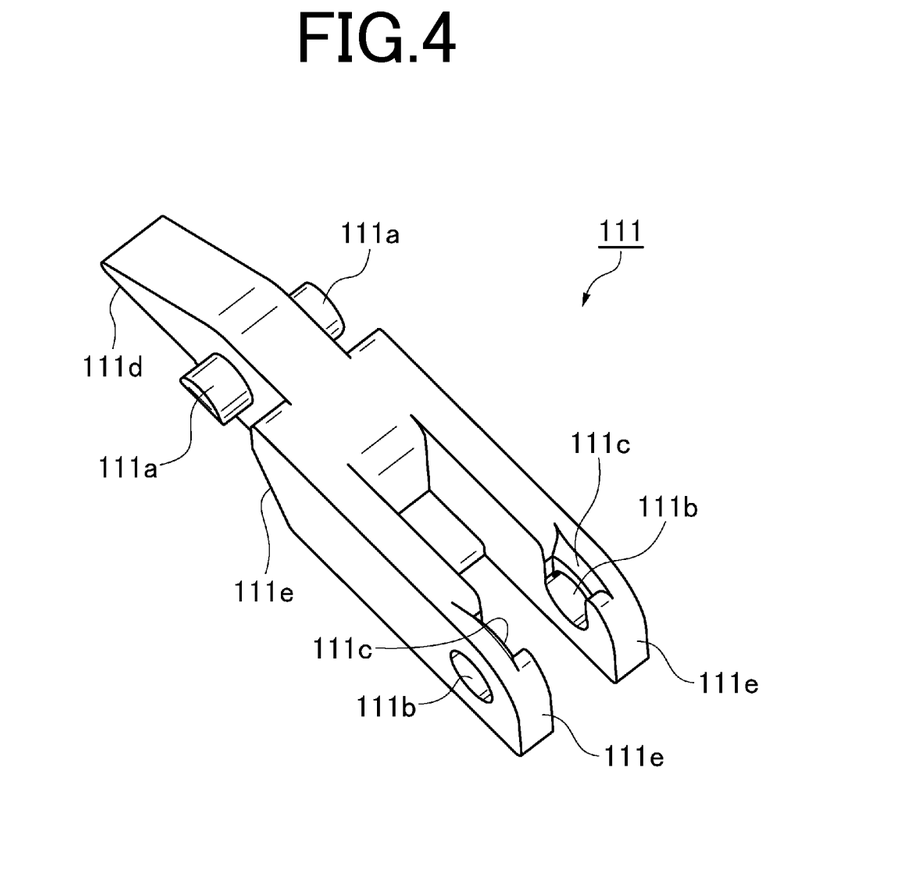
FIG. 4 is a perspective view of the synthetic resin block body shown in FIG. 1 seen from an obliquely rear upper side.
Figure 5:
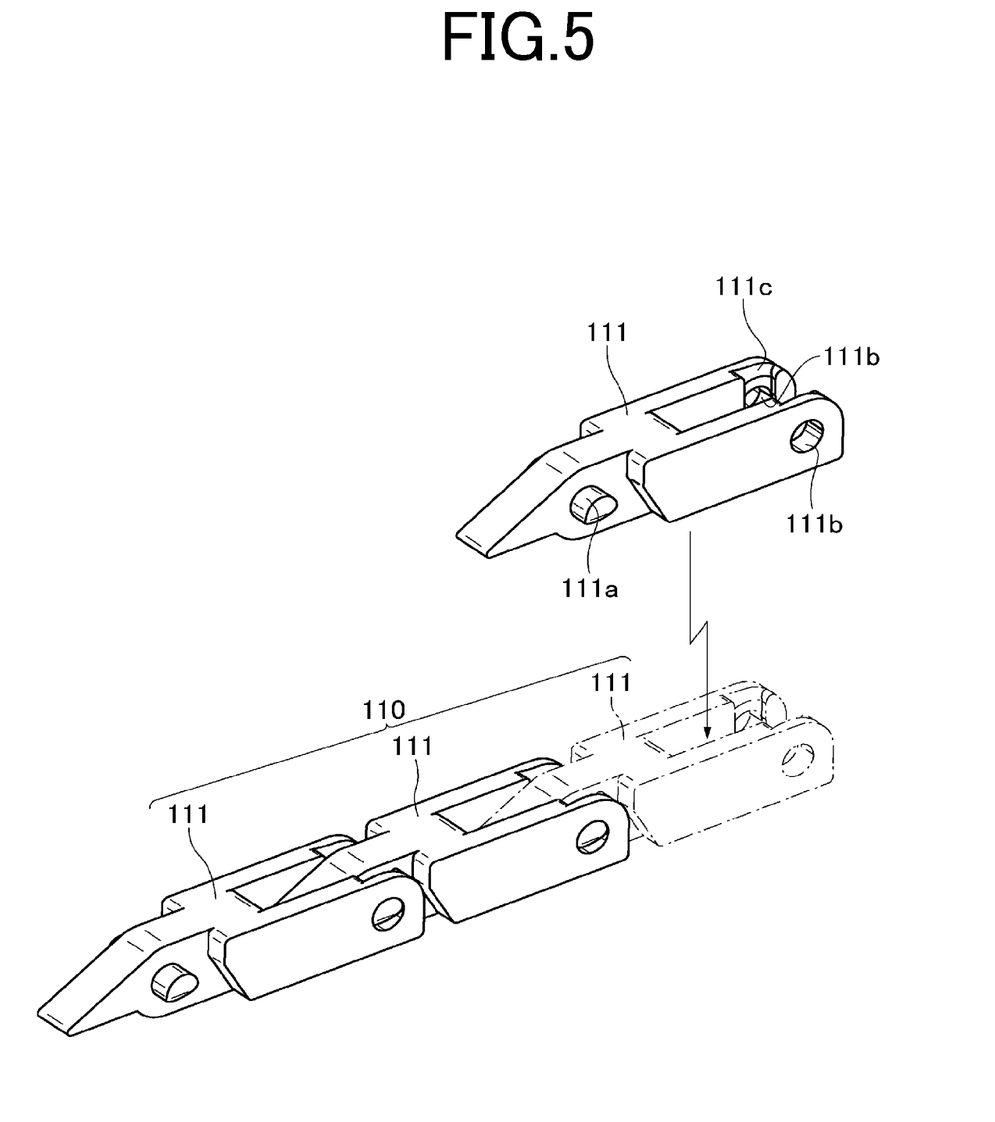
FIG. 5 is an assembly and exploded view of an articulated supporting member shown in FIG. 1.
Figure 6:
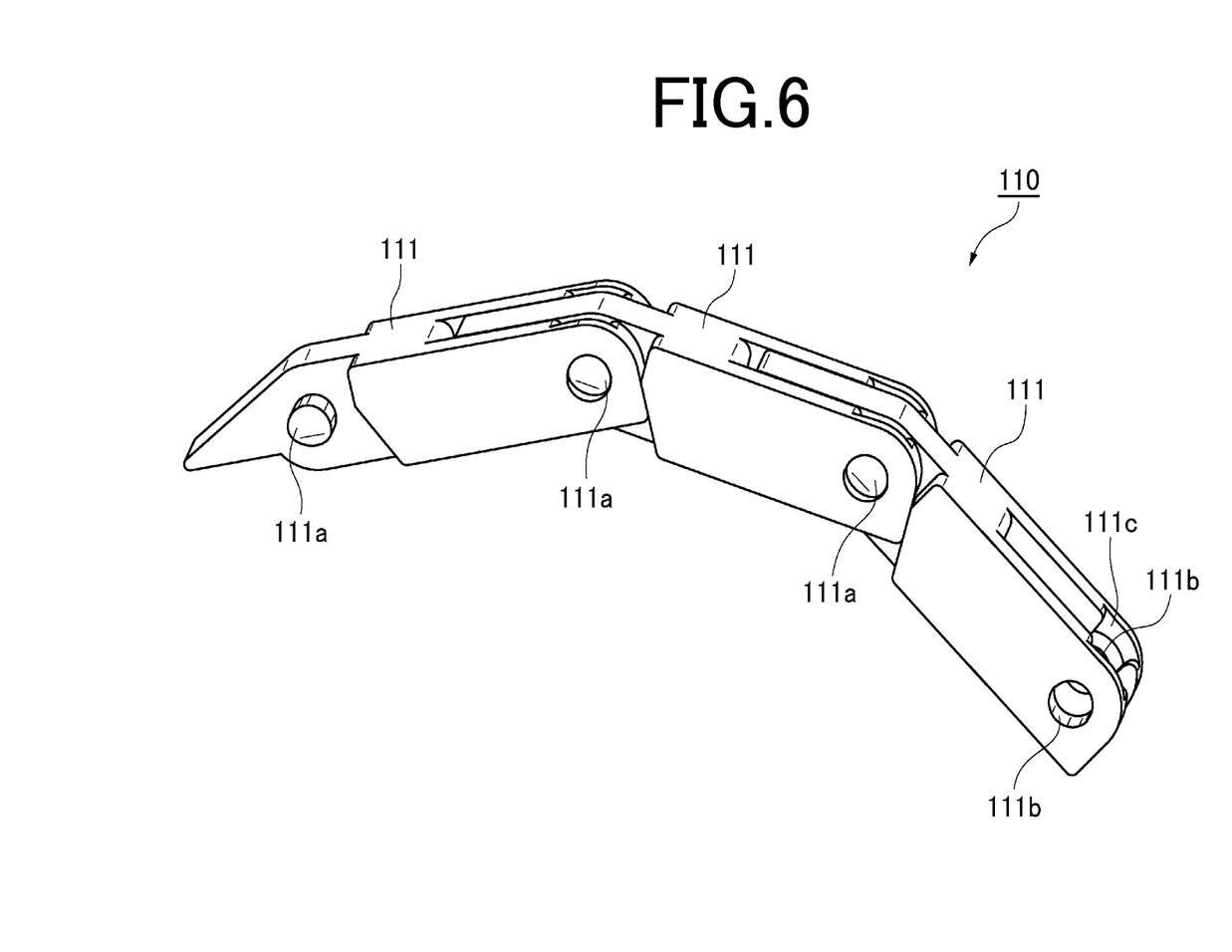
FIG. 6 is a perspective view showing a bending state of the articulated supporting member shown in FIG. 1.
Figure 7:
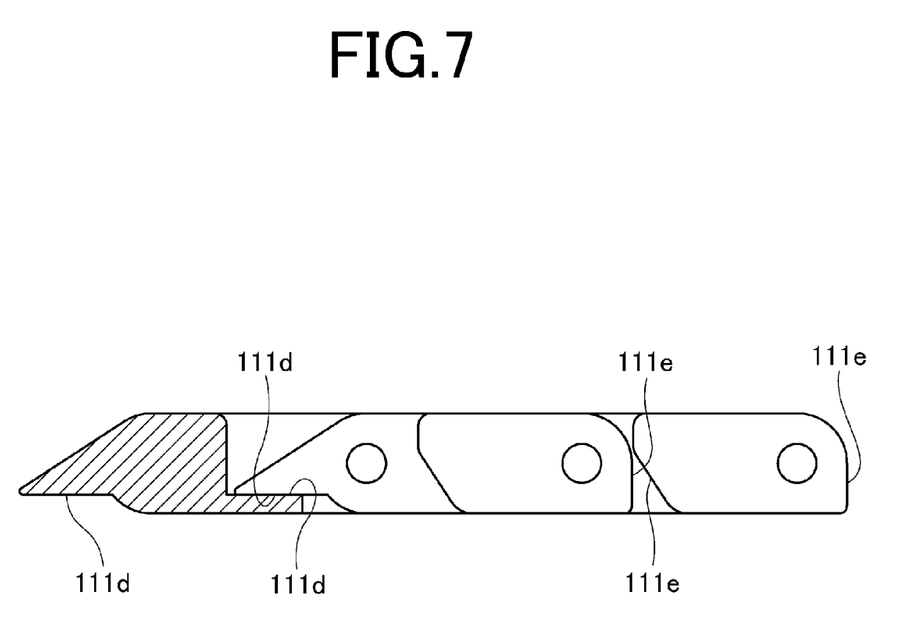
FIG. 7 is a side view showing a straight state of the articulated supporting member.
Figure 8:
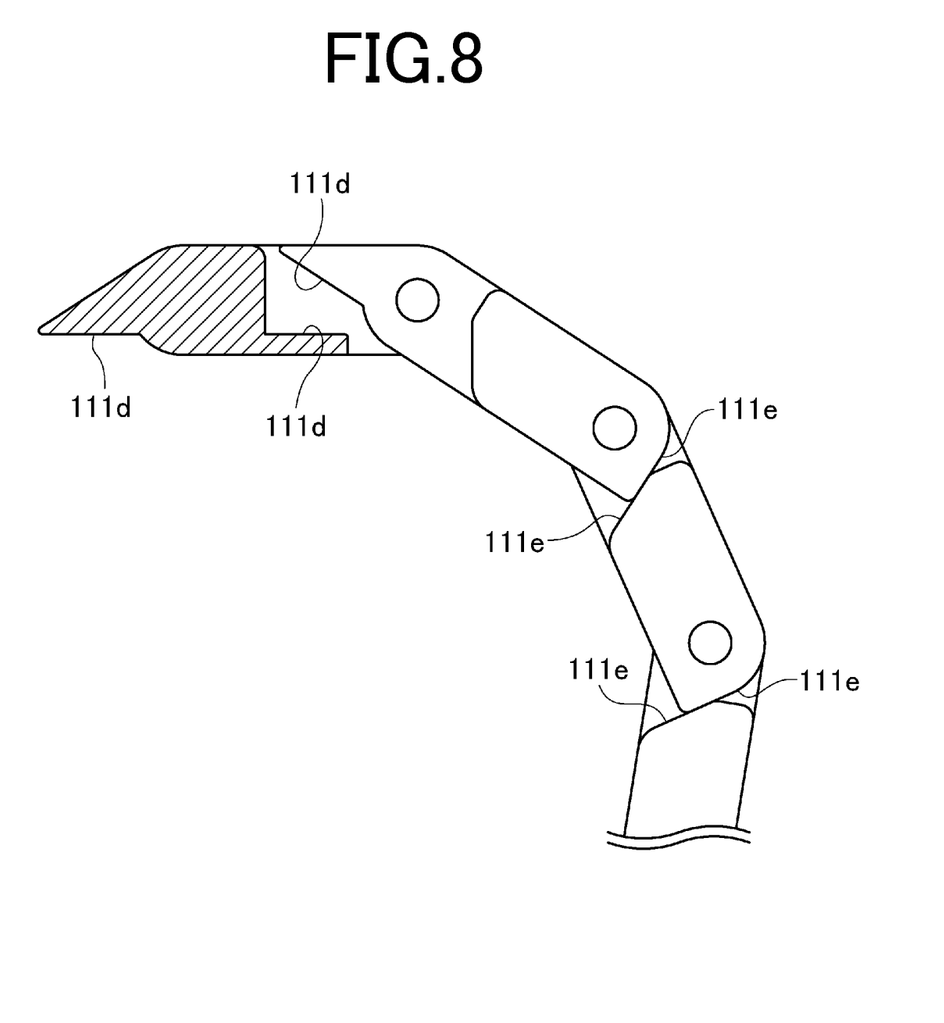
FIG. 8 is a side view showing the bending state of the articulated supporting member.

FIG. 1 is a schematic drawing of an articulated cable protection and guide apparatus 100 of the first embodiment of the invention. FIG. 2 is a section view taken along a line X-X in FIG. 1. FIG. 3 is a perspective view of a synthetic resin block body 111 shown in FIG. 1 seen from an obliquely front upper side. FIG. 4 is a perspective view of the synthetic resin block body 111 shown in FIG. 1 seen from an obliquely rear upper side. FIG. 5 is an assembly and exploded view of an articulated supporting member 110 shown in FIG. 1. FIG. 6 is a perspective view showing a bending state of the articulated supporting member 110 shown in FIG. 1. FIG. 7 is a side view showing a straight state of the articulated supporting member 110. FIG. 8 is a side view showing the bending state of the articulated supporting member 110.

As shown in FIG. 1, the articulated cable protection and guide apparatus 100 of the first embodiment of the invention protects and guides flexible cables and hoses such as electric cables, optical fiber cables and fluid supplying hoses (referred to as 'cables, C' hereinafter) used for machine tools, electronic devices, industrial robots, transportation machines and other devices. The cables and/or hoses feed power, fluid, air and others to moving machines or to a mobile part of the machines, As shown in FIG. 1, the articulated cable protection and guide apparatus 100 of the first embodiment of the invention comprises articulated supporting members 110 each of which are composed of a large number (a plurality) of synthetic resin block bodies 111 linked with each other and that take straight and bending postures. The cable protection and guide apparatus includes two flexible belt members 120A, 120B. Each of the flexible belt members 120, 120B includes a plurality of tubular storing portions 121 through which the articulated supporting members 110 and/or the cables, C, are respectively inserted and stored in parallel in a belt width direction. See FIG. 2 which illustrates the tubular storing portions 121.

Although not shown in FIGS. 1 and 2, the flexible belt members 120A, 120B described above are formed by using two sheets. Each of the sheets includes fluororesin layers laminated on both front and back surfaces of a polyurethane resin layer. Then, the tubular storing portions 121 for inserting the cables, C, are integrally molded between the two sheets which bulge on the front and back surfaces of the sheets.

Thereby, the polyurethane resin layer exhibits elasticity of the flexible belt members 120A, 120B and a self-lubricant effect of the fluororesin layers exhibits slidability of the flexible belt members 120A, 120B, protecting the cables, C, without resistance.

The articulated supporting member 110 described above is composed of a large number (a plurality) of synthetic resin block bodies 111 that fit concavo-convexly with each other and that are flexibly linked as shown in FIGS. 3 through 5.

The articulated supporting member 110 can be obtained by linking the synthetic resin block bodies 111 with each other without injection-molding pieces one by one (one at a time) to stainless steel or a leaf spring as disclosed in the prior art supporting member. The number of parts required for the articulated supporting member 110 is reduced compared to the prior art case in which various long and short supporting members have to be stocked corresponding to usage.

Specific configurations of the articulated supporting member 110 and the flexible belt members 120A, 120B which are the most characteristic parts of the articulated cable protection and guide apparatus 100 of the first embodiment of the invention, will now be explained in detail.

Firstly, as shown in FIGS. 1 and 2, the flexible belt member 120A has three tubular storing portions 121 disposed on the inner circumferential side and the flexible belt member 120B has two tubular storing portions 121 disposed on the outer circumferential side. The flexible belt members 120A, 120B are disposed so as to overlap vertically in two-stage in the articulated cable protection and guide apparatus 100 of the first embodiment of the invention.

Thereby, it becomes possible to arrange, array and store a large number of cables, C, by sorting and inserting them into the flexible belt member 120A on the inner circumferential side and the flexible belt member 120B on the outer circumferential side. The flexible belt members are overlapped vertically in two-stages and the arrangement is not limited to arraying and storing the cables, C, only in the belt width direction.

Flexible belt members 120A, 120B as described above have vertically symmetrical wavy sections 120a formed of the plurality of tubular storing portions 121 equally parted in the belt width direction as shown in FIG. 2.

Thereby, the flexible belt members 120A, 120B disposed vertically in the two-stages overlap with each other while engaging concavo-convexly in a nesting condition through the configuration of the vertically symmetrical wavy sections.

Flexible belt members 120A, 120B are molded of synthetic resin materials. Thereby, the shape of the tubular storing portions 121 of the flexible belt members 120A, 120B can be readily processed and molded in the desired shapes.

Next, the articulated supporting members 110 are inserted and stored, respectively, in the tubular storing portions 121 arrayed on both lateral sides in the belt width direction of the flexible belt member 120A disposed on the inner circumferential side. Each storing portion 121 receives one articulated supporting member. The articulated supporting members 110 are arranged on the inner circumferential side rather than the outermost circumferential side of the flexible belt members 120A, 120B when they take the bending posture as shown in FIGS. 1 and 2.

Thereby, the articulated supporting members 110 maintain the flexible belt member 120 in a laterally well-balanced manner without causing torsion or deflection on either side in the belt width direction of the flexible belt member 120A during straight and bending postures. Flexible belt member 120B disposed on the outermost circumferential side, during repetitive movement between straight and bending postures, contacts a peripheral installation member, G, such as a machine frame, so that it absorbs a bending impact from the peripheral installation member G and blocks its influence to the articulated supporting members 110 inserted through the flexible belt member 120A on the inner circumferential side.

In FIGS. 3 through 6, a link pin 111a provided at a front side surface region of the synthetic resin block body 111 fits concavo-convexly with a link pin hole 111b provided at a rear side surface region of a preceding synthetic resin block body 111. Once linked together, both synthetic resin block bodies can be bent (rotated with respect to each other).

Thus, the link pin 111a of the succeeding synthetic resin block body 111 is pivotably supported by the link pin hole 111b of the preceding synthetic resin block body 111.

Furthermore, as shown in FIGS. 3 and 4, a tapered cutaway fitting portion 111c for concavo-convexly fitting the link pin 111a of the front side surface region to the link pin hole 111b of the rear side surface region in the vertical direction is concavely provided continuously to the link pin hole 111b of the rear side surface region.

Link pin 111a of the succeeding synthetic resin block body 111 can be attached to the link pin hole 111b of the preceding synthetic resin block body 111 via the tapered cutaway fitting portion 111c thereof without requiring excessive fitting force in cutting and connecting the synthetic resin block bodies 111 of the articulated supporting member 110.

Synthetic resin block body 111 is provided with a straight posture keeping plane 111d for maintaining synthetic resin block bodies 111 in a straight condition and a bending posture keeping plane 111e for maintaining the synthetic resin block bodies 111 in a bending condition as shown in FIGS. 7 and 8.

Thereby, the straight posture keeping plane 111d and the bending posture keeping plane 111e position retain the articulated supporting member 110 in the straight and bending postures as required.

It is noted that the synthetic resin block body 111 described above has a substantially rectangular section whose four corners are chamfered along a longitudinal direction thereof as schematically shown in FIG. 2.

Thereby, the circumferential four corners of the synthetic resin block body 111 are not caught within the tubular storing portion 121 even if the synthetic resin block bodies 111 are displaced, relatively, up and down, and, left and right, within the tubular storing portion 121 of the flexible belt member 120. Thus, the articulated supporting member 110 composed of a large number (a plurality) of linked synthetic resin block bodies 111 handles the bending and straight postures smoothly within the tubular storing portion 121 of the flexible belt member 120.

All of the synthetic resin block bodies 111 composing the articulated supporting member 110 used in the articulated cable protection and guide apparatus 100 of the present embodiment are molded from glass-fiber reinforced polyamide 66 resin.

Thereby, it becomes possible to readily mold the link pin 111a at the front side surface region, the link pin hole 111b at the rear side surface region, the tapered cutaway fitting portion 111c for concavo-convexly fitting the link pin, the straight posture keeping plane 111d for keeping the straight condition, the bending posture keeping plane 111e for keeping the bending condition and other features composing the synthetic resin block body 111. It becomes also possible to easily produce the light-weight synthetic resin block bodies 111 that can be cut and connected corresponding to desired usage and length of the device. The glass-fiber reinforced polyamide 66 resin exhibits its self-lubricant effect, so that the link pin 111a is smoothly turned with respect to the link pin hole 111b at the axial support portion and power required for shifting between the bending posture and the straight posture is considerably reduced.

In the articulated cable protection and guide apparatus 100 of the first embodiment of the invention the two flexible belt members 120A, 120B are disposed in the belt longitudinal direction so as to overlap vertically in two-stages, and, the articulated supporting members 110 are respectively inserted and stored in the tubular storing portions 121 arrayed on both the right and left sides of the flexible belt member 120A disposed on the inner circumferential side. Because of the aforementioned structural arrangement, it is possible to steadily store the cables, C, to be protected and guided, even when their number increases, without changing the installation space in the belt width direction. It also becomes possible to operate between straight and bending postures, to stably guide the cables, C, inserted respectively through the plurality of tubular storing portions 121 and to assure durability of the articulated supporting members 110 for a long period of time.

Because the flexible belt members 120A, 120B described above are molded of the synthetic resin material and, respectively, have the vertically symmetrical wavy sections formed of the plurality of tubular storing portions 121 equally parted in the belt width direction, the light-weight flexible belt members 120A, 120B corresponding to shapes of the cables, C, can be easily manufactured. Still more, it becomes possible not only to reduce slidable-contact wear that is prone to occur between flexible belt members 120A, 120B and the cables, C, but also to prevent side slip that is prone to occur between the flexible belt members 120A, 120B in the belt width direction thereof disposed vertically in the two-stages and operate steadily between straight and bending postures even when an unexpected load is applied from the belt width direction during the cable protecting and guiding action.

Link pin 111a, provided at the front side surface region of the synthetic resin block body 111, fits concavo-convexly with the link pin hole 111b provided at the rear side surface region of the preceding synthetic resin block body 111, enabling both synthetic resin block bodies to rotate with respect to each other. The tapered cutaway fitting portion 111c for concavo-convexly enables the assembly of link pin 111a of the front side surface region to the link pin hole 111b of the rear side surface region in the vertical direction. The cutaway fitting portion 111c is concavely provided continuously to the link pin hole 111b of the rear side surface region. The synthetic resin block body 111 is provided with the straight posture keeping plane 111d for keeping the synthetic resin block bodies 111 in the straight condition and the bending posture keeping plane 111e for keeping the synthetic resin block bodies 111 in the bending condition. The synthetic resin block bodies 111 of the articulated supporting member 110 shift smoothly from the straight posture to the bending posture and from the bending posture to the straight posture. Still more, the articulated supporting member 110 can be easily cut and connected corresponding to its desired usage and can securely protect and guide the cables between the bending posture and the straight posture even in a relatively small installation space. Thus, the advantageous effects of the articulated supporting member 110 are remarkable.

Second Embodiment

Next, an articulated cable protection and guide apparatus 200 of a second embodiment of the invention will be explained with reference to FIG. 9.

Figure 9:
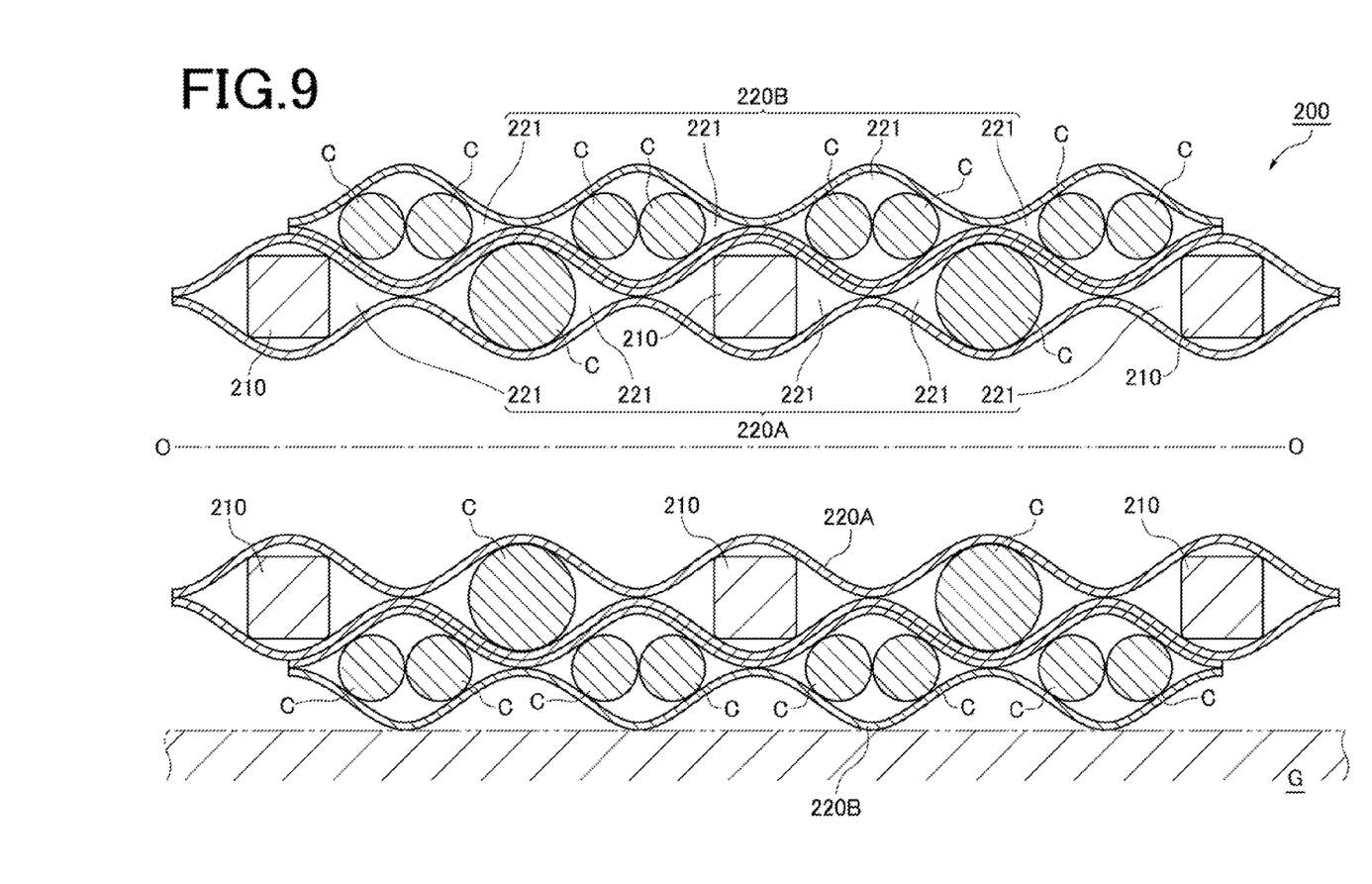
FIG. 9 is a section view of the articulated cable protection and guide apparatus according to a second embodiment of the invention.

FIG. 9 is a section view of the articulated cable protection and guide apparatus 200 of the second embodiment of the invention corresponding to the section view taken along the line X-X in FIG. 1.

The same or corresponding parts of the articulated cable protection and guide apparatus 200 shown in FIG. 9 with those of the articulated cable protection and guide apparatus 100 of the first embodiment described above will be denoted by the corresponding reference numerals in 200s and an overlapped explanation thereof will be omitted here.

Specific modes of an articulated supporting member 210 and flexible belt members 220A, 220B, which are the most characteristic parts in the articulated cable protection and guide apparatus 200 of the second embodiment of the invention, will be explained That is, the flexible belt member 220A includes five tubular storing portions 221 disposed on the inner circumferential side and the flexible belt member 220B includes four tubular storing portions 221 disposed on the outer circumferential side are disposed so as to overlap vertically in two-stages.

The articulated supporting members 210 are inserted and stored in the tubular storing portions 221 arrayed on both the right and left sides and at the center in the belt width direction of the flexible belt member 220A disposed on the inner circumferential side during the bending posture. Each storing portion 221 holds a single articulated supporting member 210.

Thereby, even when the flexible belt members 220A, 220B which are wide in the belt width direction are used, the articulated supporting members 210 inserted and stored in the center tubular storing portion 221 holds the flexible belt members 220A, 220B in a laterally well-balanced manner without causing twist or deflection in the belt width direction of the flexible belt members 220A, 220B.

Then, even when the cables, C, to be protected and guided increase in number, the articulated cable protection and guide apparatus 200 of the second embodiment of the invention can steadily store the cables, C. The structure of FIG. 9, the second embodiment, can operate between straight and bending postures and can stably guide the cables, C. The structure of FIG. 9 can add additional cables, C, if not originally fully populated into the plurality of tubular storing portions 221 without changing the installation space in the belt width direction similarly to the cable protection and guide apparatus 100 of the first embodiment of the invention described above.

Third Embodiment

Next, an articulated cable protection and guide apparatus 300 of a third embodiment of the invention will be explained with reference to FIG. 10.

Figure 10:
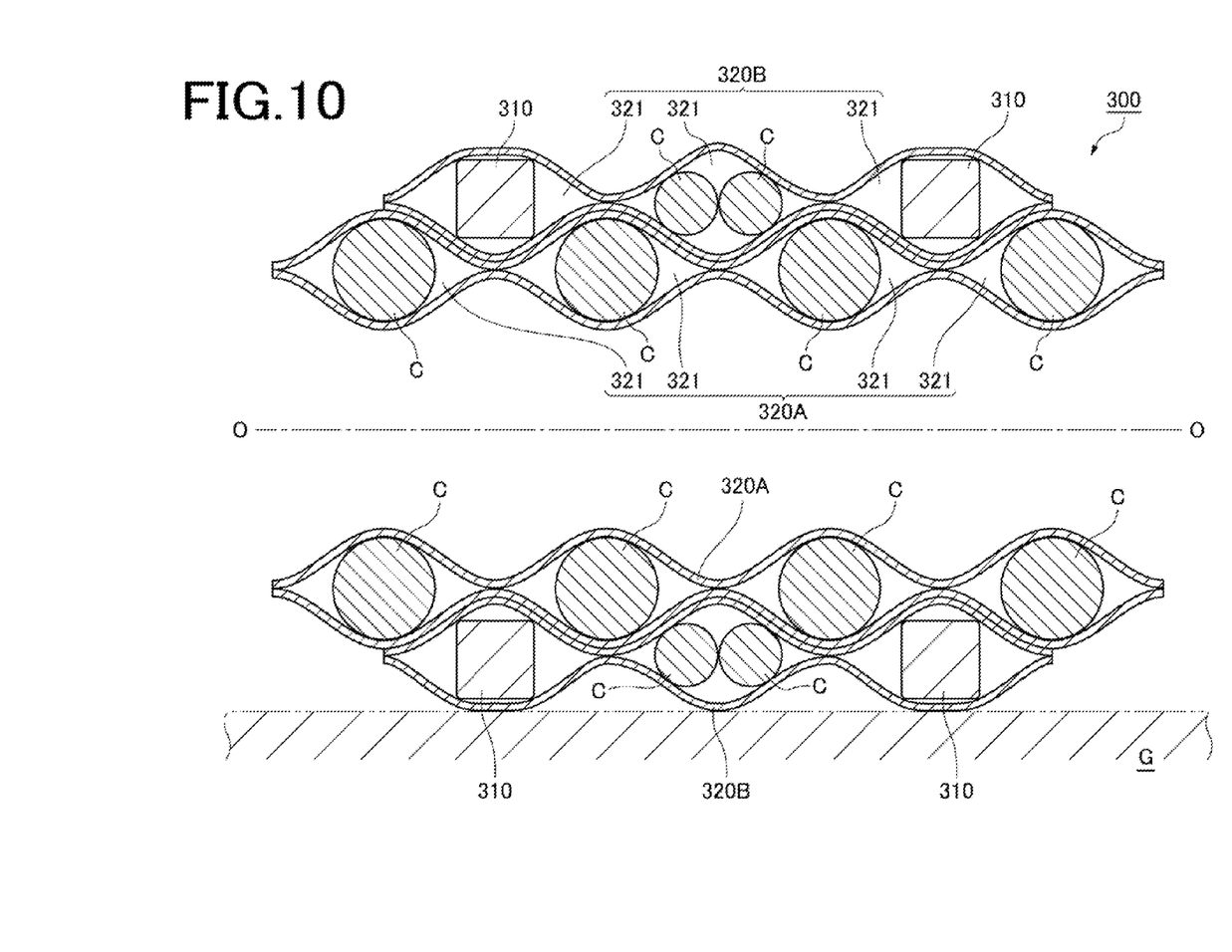
FIG. 10 is a section view of the articulated cable protection and guide apparatus according to a third embodiment of the invention.

Here, FIG. 10 is a section view of the articulated cable protection and guide apparatus 300 of the third embodiment of the invention corresponding to the section view taken along the line X-X in FIG. 1.

The same or corresponding parts of the articulated cable protection and guide apparatus 300 shown in FIG. 10 with those of the articulated cable protection and guide apparatus 100 of the first embodiment described above will be denoted by the corresponding reference numerals in 300s and an overlapped explanation thereof will be omitted here.

Then, specific modes of a articulated supporting member 310 and flexible belt members 320A, 320B, which are the most characteristic parts in the articulated cable protection and guide apparatus 300 of the third embodiment of the invention, will be explained.

That is, the flexible belt member 320A includes four tubular storing portions 321 disposed on the inner circumferential side and the flexible belt member 320B includes three tubular storing portions 221 disposed on the outer circumferential side are disposed so as to overlap vertically in two-stages.

The articulated supporting members 310 are inserted and stored in the tubular storing portions 321 arrayed on both the right and left sides in the belt width direction of the flexible belt member 320B disposed on the outer circumferential side during the bending posture. Each storing portion 321 accommodates one articulated supporting member 310.

Thereby, the articulated supporting members 310 engage with and are supported by the peripheral contact member indirectly through the intermediary of the flexible belt member 320B disposed on the outermost circumferential side during repetitive operations of the straight and bending postures.

Then, even when the cables, C, to be protected and guided increase in number, the articulated cable protection and guide apparatus 300 of the third embodiment of the invention can steadily store the cables, C, and can stably operate between straight and bending postures. When the number of cables, C, increases, additional cables C can be added if the tubular storing portions were not originally populated without changing the installation space in the belt width direction similarly to the articulated cable protection and guide apparatus 100 of the first embodiment of the invention described above. Thus, the advantageous effects of the apparatus 300 are remarkable.

The specific mode of the articulated cable protection and guide apparatus of the present invention may take any mode as long as the apparatus comprises:

articulated supporting members, each of the articulating supporting members includes a plurality of synthetic resin block bodies linked with each other, the block bodies are arranged in straight and bending postures;

a plurality of flexible belt members, each of the plurality of flexible belt members includes a plurality of tubular storing portions;

each of the flexible belt members includes a width, a length, a left side and a right side;

the articulated supporting members and/or cables are arranged in parallel in the flexible belt member width direction and are inserted and stored in the flexible belt members;

wherein the plurality of flexible belt members is disposed in the flexible belt longitudinal direction, the flexible belt members are overlapped vertically; and the articulated supporting members are inserted and stored in the tubular storing portions arranged on the right side and the left side of at least one of said flexible belt members.

Then, the apparatus can securely and stably guide the large number of cables, C, can assure durability of the articulated supporting members operating between straight and bending postures for a long period of time and can be easily cut and connected corresponding to its usage.

For instance, a material of the flexible belt member used in the articulated cable protection and guide apparatus of the invention may be a synthetic resin material. The plurality of tubular storing portions and other portions can be made of the synthetic material. When fluororesin layers are laminated on both front and back surfaces of an extensible layer, the extensible layer can exhibit extensibility of the flexible belt member and the fluororesin layer can exhibit slidability of the flexible belt member.

Here, it is preferable to use PTFE (polytetrafluoroetylene) for the fluororesin layer of the flexible belt member because it has low friction and it is preferable to use polyurethane resin for the extensible layer.

The specific configuration of each flexible belt member described above may be either one of having the plurality of tubular storing portions equally parted across the belt width direction and having the circular cross-section, one having the plurality of tubular storing portions equally parted across the belt width direction and having the rectangular cross-section or one having the plurality of tubular storing portions parted equally across the belt width direction and having the vertically symmetrical wavy cross-sections, or one having those plurality of shapes of tabular storing portions as shown in FIGS. 10 and 11 for example. However, it is preferable to have the vertically symmetrical wavy cross-sections because thereby, it becomes possible to securely engage and overlap the vertically disposed flexible belt members with each other in the nesting condition. Then, it becomes possible to prevent side slip that is otherwise prone to occur in the belt width direction of the vertically disposed flexible belt members and to steadily take the straight and bending postures in protecting and guiding the cables.

The specific disposition of the plurality of flexible belt members described above will do if the flexible belt members are disposed in the belt longitudinal direction so as to overlap vertically in the multi-stage. This disposition allows the cables to be steadily stored without changing the installation space in the belt width direction.

Here, when the plurality of flexible belt members is disposed so as to overlap vertically in the multi-stage, a sheet-like bracing member is interposed which contains adhesive or which has a surface configuration whose frictional resistance is large. This structure prevents slipping of the vertically arranged flexible belt members in the belt width and belt longitudinal directions that is prone to occur between the flexible belt members and to steadily operate between straight and bending postures.

In addition, when the sheet-like bracing member described above contains electrical noise suppressant, it becomes possible to block electrical noises that are prone to occur in the cables.

A number of tubular storing portions provided in the flexible belt member may be any number as long as it is at least a plural number to insert and store the articulated supporting member and/or the cables, C. The number of the tubular storing portions in the flexible belt member is preferable to be a number by which the cables can be respectively inserted because it permits to prevent the cables, C, from contacting with each other.

Specifically, morphological stability and seating or so-called mutual adaptivity between the flexible belt members disposed vertically in the multi-stage is good when the numbers of the tubular storing portions are set to be odd and even numbers alternately.

The specific configuration of the articulated supporting member used in the articulated cable protection and guide apparatus of the invention may be any configuration as long as it is composed of a large number of synthetic resin block bodies flexibly linked by concavo-convexly fitting with each other.

The specific configuration of each synthetic resin block body may be the arrangement already described, namely, the flexibly linked black bodies wherein the link is by concavo-convexly fitting the link pin provided at the front side surface region of the synthetic resin block body to the link pin hole provided at the rear side surface region of the preceding synthetic resin block body. Alternatively, the link may comprise a concavo-convexly fitting wherein the link pin is provided at the rear side surface region of the synthetic resin block body to the link pin hole provided at the front side surface region of the preceding synthetic resin block body. The former link arrangement is preferably in particular.

Then, the specific material of the synthetic resin block body described above may be any synthetic resin material as long as it is capable of keeping the shapes of the link pin at the front side surface region, the link pin hole at the rear side surface region, the tapered cutaway fitting portion for concavo-convexly fitting the link pin, the straight posture keeping plane for keeping the straight condition, the bending posture keeping plane for keeping the bending condition and other features. For example, it is preferable to adopt and use glass-fiber reinforced polyamide 66 resin, polyacetal resin and ABS resin for the block bodies. When the glass-fiber reinforced polyamide 66 resin is used in particular, rigidity and abrasion resistance of the articulated supporting member are improved. Therefore, the articulated supporting member can fully withstand long repetitive uses and can achieve a long life.

Still more, as for the configuration for inserting and storing the articulated supporting members to the plurality of flexible belt members, the articulated supporting members may be inserted and stored in either one of the flexible belt member disposed on the outermost circumferential side or on the inner circumferential side during the bending posture as long as they are inserted and stored in the tubular storing portions arrayed on the both right and left sides of at least one flexible belt member among the plurality of flexible belt members.

The articulated supporting members described above are inserted and stored respectively in the tubular storing portions arrayed and arranged on both lateral sides of the flexible belt member, so that the articulated supporting members can keep the flexible belt member in a laterally well-balanced manner without causing torsion or deflection in the flexible belt member in taking the straight and bending postures. However, it is also possible to insert and store the articulated supporting member in a tubular storing portion arrayed at the center of the flexible belt member.

What is claimed is:

1. An articulated cable protection and guide apparatus, comprising:
    a plurality of synthetic resin block bodies;
    each of said plurality of synthetic resin block bodies includes concave-convex fittings, said plurality of synthetic resin block bodies is pivotably, flexibly and articulately connected to each other, longitudinally, by said concave-convex fittings of each of said plurality of synthetic resin block bodies, thereby forming a train of block bodies;
    a first flexible belt member and a second flexible belt member;
    said first flexible belt member includes a plurality of tubular storing portions;
    said second flexible belt member includes a plurality of tubular storing portions;
    each of said first and second flexible belt members includes a width, a length, a left side and a right side;
    said first and second flexible belt members are disposed longitudinally;
    said first flexible belt member includes an engaging surface, said engaging surface of said first flexible belt member is vertically wavy in cross-section;
    said second flexible belt member includes an engaging surface, said engaging surface of said second flexible belt member is vertically wavy in cross-section;
    said engaging surface of said first flexible belt member and said engaging surface of said second flexible belt member are engaged concavo-convexly and nested together;
    said tubular storing portions of said first flexible belt member are vertically symmetric and wavy in cross-section;
    said tubular storing portions of said second flexible belt member are vertically symmetric and wavy in cross-section;
    said first flexible belt member and said second flexible belt member are engaged concavo-convexly and nested together and form a flexional circumferential bend;
    said flexional circumferential bend includes a flexional inner circumferential side, said second flexible belt member resides on said flexional inner circumferential side of said flexional circumferential bend;
    said flexional circumferential bend includes a flexional outer circumferential side, said first flexible belt member resides on said flexional outer circumferential side of said flexional circumferential bend;
    said train of block bodies resides in one of said plurality of tubular storing portions of said first flexible belt member to control and support straight and bending postures of said first and second flexible belt members;
    at least one cable resides: in another of said plurality of tubular storing portions of said first flexible belt member; or, in one of said plurality of tubular storing portions of said second flexible belt member; and,
    said train of block bodies residing within said one of said plurality of tubular storing portions of said first flexible belt member and said at least one cable residing in said another of said plurality of tubular storing portions of said first flexible belt member or in said one of said plurality of tubular storing portions of said second flexible belt member are arranged in parallel with respect to each other.

2. An articulated cable protection and guide apparatus according to claim 1 wherein each of said first and second flexible belt members is molded of synthetic resin materials.

3. An articulated cable protection and guide apparatus according to claim 1, further comprising:
    each of said synthetic resin block bodies includes a front side surface region and a rear side surface region;
    said concave-convex fittings of each of said synthetic resin block bodies include a link pin residing in said front side surface region of each of said synthetic resin block bodies and a link pin hole residing in said rear side surface region of each of said synthetic resin block bodies; and,
    said link pin of said concave-convex fittings of one of said synthetic resin block bodies is concavo-convexly interfitted with said link pin hole of said concave-convex fittings of a next adjacent synthetic resin block body.

4. An articulated cable protection and guide apparatus according to claim 3, further comprising:
    said concave-convex fittings of each of said synthetic resin block bodies further include a tapered concave cutaway fitting portion residing in said rear side surface region of each of said synthetic resin block bodies and in communication with said link pin hole of said concave-convex fittings of each of said synthetic resin block bodies; and,
    said link pin of said concave-convex fittings of said one of said synthetic resin block bodies, during connection with said next adjacent synthetic resin block body, slidingly engages said tapered concave cutaway fitting portion of said concave-convex fittings of said next adjacent synthetic resin block body until said link pin of said concave-convex fittings of said one of said synthetic resin block bodies enters said link pin hole of said concave-convex fittings of said next adjacent synthetic resin block body.

5. An articulated cable protection and guide apparatus according to claim 1 wherein each of said synthetic resin block bodies is provided with a straight posture keeping plane for maintaining said synthetic resin block bodies in a straight condition and a bending posture keeping plane for maintaining said synthetic resin block bodies in a bending condition.

6. An articulated cable protection and guide apparatus, comprising:
   a plurality of synthetic resin block bodies;
   each of said plurality of synthetic resin block bodies includes concave-convex fittings, said plurality of synthetic resin block bodies is pivotably, flexibly and articulately connected to each other, longitudinally, by said concave-convex fittings of each of said plurality of synthetic resin block bodies, thereby forming a train of block bodies;
   a first flexible belt member and a second flexible belt member;
   said first flexible belt member includes a plurality of tubular storing portions;
   said second flexible belt member includes a plurality of tubular storing portions;
   each of said first and second flexible belt members includes a width, a length, a left side and a right side;
   said first and second flexible belt members are disposed longitudinally;
   said first flexible belt member includes an engaging surface, said engaging surface of said first flexible belt member is vertically wavy in cross-section;
   said second flexible belt member includes an engaging surface, said engaging surface of said second flexible belt member is vertically wavy in cross-section;
   said engaging surface of said first flexible belt member and said engaging surface of said second flexible belt member are engaged concavo-convexly and nested together;
   said tubular storing portions of said first flexible belt member are vertically symmetric and wavy in cross-section;
   said tubular storing portions of said second flexible belt member are vertically symmetric and wavy in cross-section;
   said first flexible belt member and said second flexible belt member are engaged concavo-convexly and nested together and form a flexional circumferential bend;
   said flexional circumferential bend includes a flexional inner circumferential side, said second flexible belt member resides on said flexional inner circumferential side of said flexional circumferential bend;
   said flexional circumferential bend includes a flexional outer circumferential side, said first flexible belt member resides on said flexional outer circumferential side of said flexional circumferential bend;
   said train of block bodies resides in one of said plurality of tubular storing portions of said second flexible belt member to control and support straight and bending postures of said first and second flexible belt members;
   at least one cable resides: in another of said plurality of tubular storing portions of said second flexible belt member; or, in one of said plurality of tubular storing portions of said first flexible belt member; and,
   said train of block bodies residing within said one of said plurality of tubular storing portions of said second flexible belt member and said at least one cable residing in said another of said plurality of tubular storing portions of said second flexible belt member or in said one of said plurality of tubular storing portions of said first flexible belt member are arranged in parallel with respect to each other.

7. An articulated cable protection and guide apparatus according to claim 6 wherein each of said first and second flexible belt members is molded of synthetic resin materials.

8. An articulated cable protection and guide apparatus according to claim 6, further comprising:
   each of said synthetic resin block bodies includes a front side surface region and a rear side surface region;
   said concave-convex fittings of each of said synthetic resin block bodies include a link pin residing in said front side surface region of each of said synthetic resin block bodies and a link pin hole residing in said rear side surface region of each of said synthetic resin block bodies; and,
   said link pin of said concave-convex fittings of one of said synthetic resin block bodies is concavo-convexly interfitted with said link pin hole of said concave-convex fittings of a next adjacent synthetic resin block body.

9. An articulated cable protection and guide apparatus according to claim 8, further comprising:
   said concave-convex fittings of each of said synthetic resin block bodies further include a tapered concave cutaway fitting portion residing in said rear side surface region of each of said synthetic resin block bodies and in communication with said link pin hole of said concave-convex fittings of each of said synthetic resin block bodies; and,
   said link pin of said concave-convex fittings of said one of said synthetic resin block bodies, during connection with said next adjacent synthetic resin block body, slidingly engages said tapered concave cutaway fitting portion of said concave-convex fittings of said next adjacent synthetic resin block body until said link pin of said concave-convex fittings of said one of said synthetic resin block bodies enters said link pin hole of said concave-convex fittings of said next adjacent synthetic resin block body.

10. An articulated cable protection and guide apparatus according to claim 6 wherein each of said synthetic resin block bodies is provided with a straight posture keeping plane for maintaining said synthetic resin block bodies in a straight condition and a bending posture keeping plane for maintaining said synthetic resin block bodies in a bending condition.

* * * * *